United States Patent
Buelow et al.

(10) Patent No.: US 9,765,995 B2
(45) Date of Patent: Sep. 19, 2017

(54) CRYOCOOLERS WITH ELECTRONIC CRYOSTAT FLOW CONTROLLERS AND RELATED SYSTEM AND METHOD

(75) Inventors: Paul L. Buelow, Tucson, AZ (US); Marianne D. Goble, Tucson, AZ (US); Javier B. Heyer, Tucson, AZ (US)

(73) Assignee: RAYTHEON COMPANY, Waltham, MA (US)

( * ) Notice: Subject to any disclaimer, the term of this patent is extended or adjusted under 35 U.S.C. 154(b) by 718 days.

(21) Appl. No.: 13/535,071

(22) Filed: Jun. 27, 2012

(65) Prior Publication Data

US 2014/0311166 A1 Oct. 23, 2014

(51) Int. Cl.
*F25B 9/00* (2006.01)
*F25B 9/14* (2006.01)
*F25B 9/02* (2006.01)

(52) U.S. Cl.
CPC ...... *F25B 9/14* (2013.01); *F25B 9/02* (2013.01); *F25B 2309/1428* (2013.01); *F25B 2341/06* (2013.01); *F25B 2341/063* (2013.01); *F25B 2341/065* (2013.01); *F25B 2341/067* (2013.01); *F25B 2700/21* (2013.01)

(58) Field of Classification Search
CPC .......... F25B 9/02; F25B 9/14; F25B 2309/02–2309/023; F25B 2341/065; F25B 2341/067; F25B 2341/063; F25B 2341/06; F25B 2700/21
USPC ............................ 62/6, 51.2, 51.1
See application file for complete search history.

(56) References Cited

U.S. PATENT DOCUMENTS

| | | | | |
|---|---|---|---|---|
| 5,673,593 A | * | 10/1997 | Lafferty | 74/89.38 |
| 5,913,889 A | | 6/1999 | Buelow et al. | |
| 5,918,471 A | | 7/1999 | Mangano et al. | |
| 5,974,808 A | | 11/1999 | Mangano et al. | |
| 6,016,659 A | * | 1/2000 | Westhoven et al. | 62/51.2 |

(Continued)

FOREIGN PATENT DOCUMENTS

| | | | | |
|---|---|---|---|---|
| CA | 2178124 | * | 4/1996 | F25B 49/02 |
| CA | 2 178 124 C | | 12/1996 | |
| EP | WO 2005097509 | * | 10/2005 | B41J 29/393 |

OTHER PUBLICATIONS

N Ma and G Song, Control of shape memory alloy actuator using pulse width modulation, Sep. 25, 2003, University of Houston, p. 712-719.*

(Continued)

*Primary Examiner* — Frantz Jules
*Assistant Examiner* — Webeshet Mengesha

(57) ABSTRACT

A system includes a cryocooler configured to cool an object, a sensor configured to measure a temperature of the object, and a controller configured to generate an actuator drive signal to control the cryocooler based on at least one temperature measurement from the sensor. The cryocooler includes a heat exchanger and a needle configured to control flow of coolant gas through the heat exchanger. The cryocooler also includes a motion rod configured to move the needle and an actuator assembly configured to move the motion rod to thereby move the needle. The actuator could include a motor and a gear head configured to rotate a lead screw and a lead screw nut located around the lead screw and configured to translate rotational motion of the lead screw into linear motion. The actuator could also include a piezoelectric actuator or a linear actuator.

15 Claims, 14 Drawing Sheets

(56) References Cited

U.S. PATENT DOCUMENTS

| | | | |
|---|---|---|---|
| 6,082,119 A | 7/2000 | Ellison et al. | |
| 2008/0072608 A1* | 3/2008 | Rampersad | F25B 9/145 62/6 |
| 2011/0249050 A1* | 10/2011 | Ozawa | B41J 2/04528 347/10 |

OTHER PUBLICATIONS

J. Abadie, et al., "An integrated shape memory alloy micro-actuator controlled by thermoelectric effect", Sensors and Actuators A 99 (2002), p. 297-303.

* cited by examiner

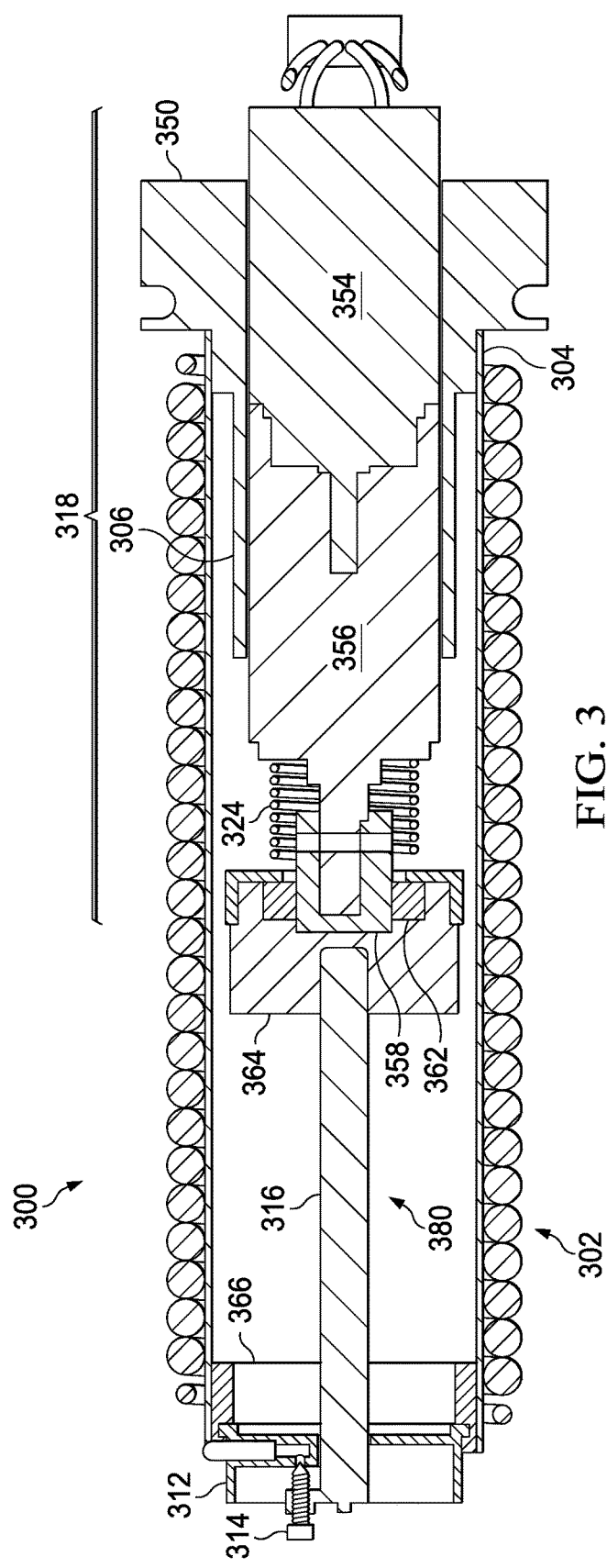

CRYOCOOLERS WITH ELECTRONIC CRYOSTAT FLOW CONTROLLERS AND RELATED SYSTEM AND METHOD

TECHNICAL FIELD

This disclosure is generally directed to cryogenic cooling systems. More specifically, this disclosure is directed to cryocoolers with electronic cryostat flow controllers and related system and method.

BACKGROUND

A focal plane array is an image sensing device where pixels are positioned at the focal plane of a lens. Focal plane arrays are used in various types of applications, including air-to-air missiles and anti-tank missiles where the arrays are used as infrared sensors. In these types of applications, it is often necessary or desirable to maintain the temperature of a focal plane array at a particular temperature or within a very narrow temperature range.

Variable-flow Joule-Thomson cryostats are often used to cool very large focal plane arrays in these types of applications. However, these cryostats can suffer from various drawbacks. For example, these cryostats can be quite inefficient in their use of coolant gas, and they can be very unstable in controlling the temperatures of focal plane arrays. Moreover, these cryostats are prone to clogging, which interrupts their normal operation. In addition, some attempts have been made to incorporate shape memory metal actuators into Joule-Thomson cryostats, but those actuators are slow and imprecise. Any failure or other shortcoming of a cryostat can interfere with the proper operation of air-to-air missiles, anti-tank missiles, and other ordnance.

SUMMARY

This disclosure provides cryocoolers with electronic cryostat flow controllers and related system and method.

In a first embodiment, a system includes a cryocooler configured to cool an object, a sensor configured to measure a temperature of the object, and a controller configured to generate an actuator drive signal to control the cryocooler based on at least one temperature measurement from the sensor. The cryocooler includes a heat exchanger and a needle configured to control flow of coolant gas through the heat exchanger. The cryocooler also includes a motion rod configured to move the needle and an actuator assembly configured to move the motion rod to thereby move the needle.

In a second embodiment, an apparatus includes a cryocooler configured to cool an object. The cryocooler includes a heat exchanger and a needle configured to control flow of coolant gas through the heat exchanger. The cryocooler also includes a motion rod configured to move the needle and an actuator assembly configured to move the motion rod to thereby move the needle.

In a third embodiment, a method includes receiving a drive signal and operating an actuator in a cryocooler using the drive signal. The method also includes moving a motion rod using the actuator and moving a needle to control a flow of coolant in a heat exchanger of the cryocooler, where the needle is connected to the motion rod.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which:

FIG. 3 illustrates a second example cryocooler with an electronic cryostat flow controller in accordance with this disclosure;

DETAILED DESCRIPTION

FIGS. 1 through 7, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

Figure 1:
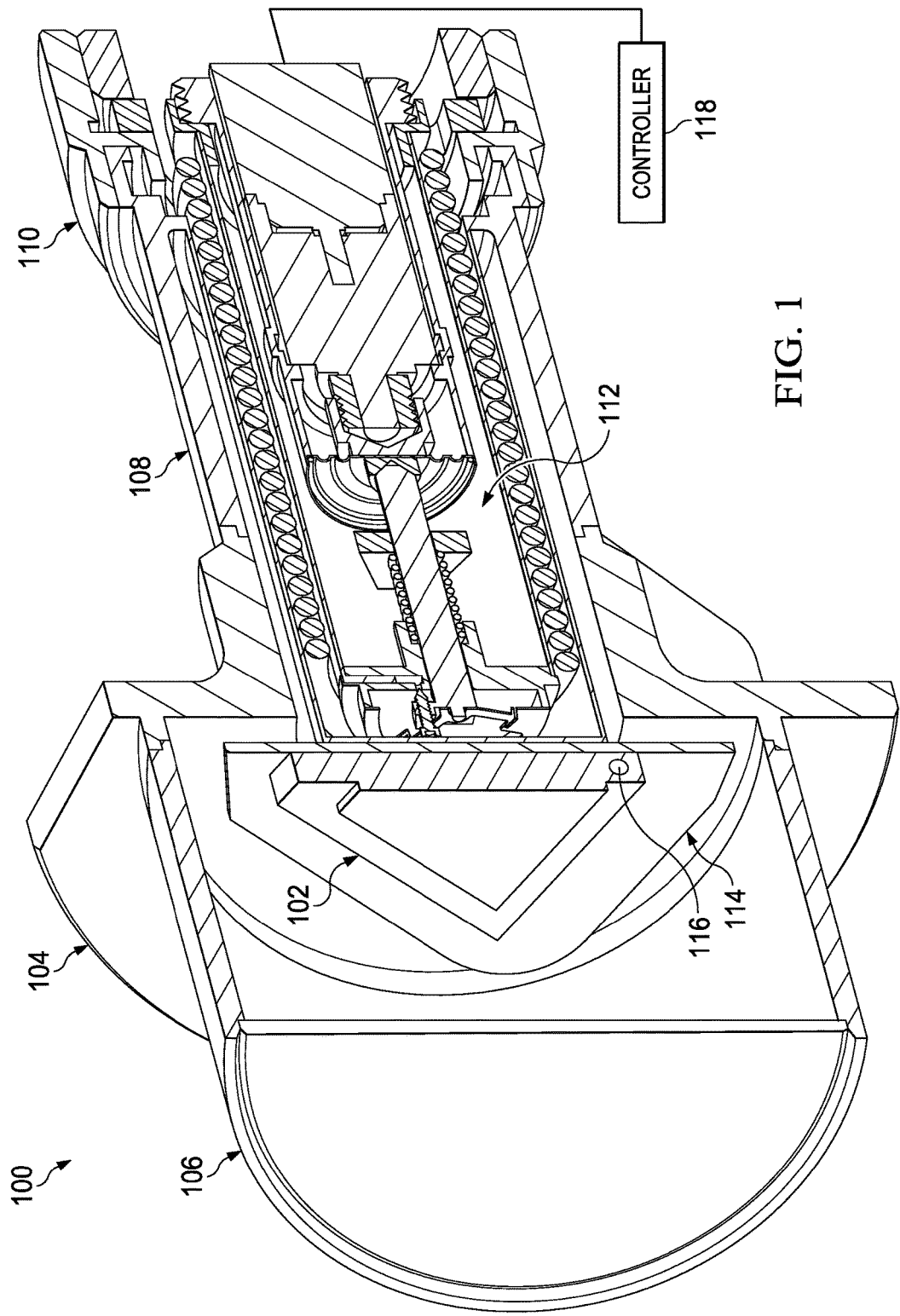
FIG. 1 illustrates an example system using a cryocooler with an electronic cryostat flow controller in accordance with this disclosure.
Figure 2A:
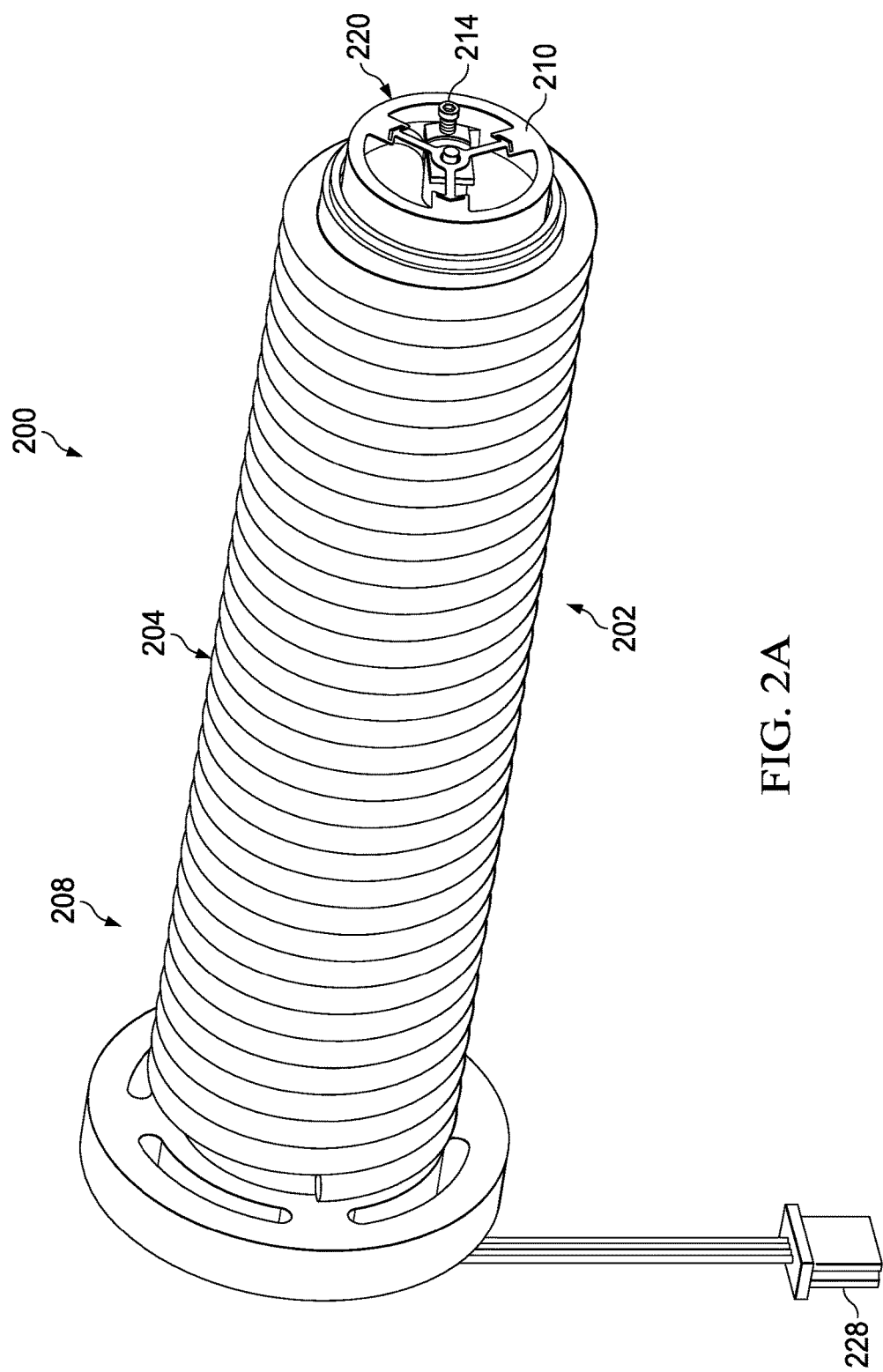
FIGS. 2A through 2I illustrate a first example cryocooler with an electronic cryostat flow controller in accordance with this disclosure.
Figure 2B:
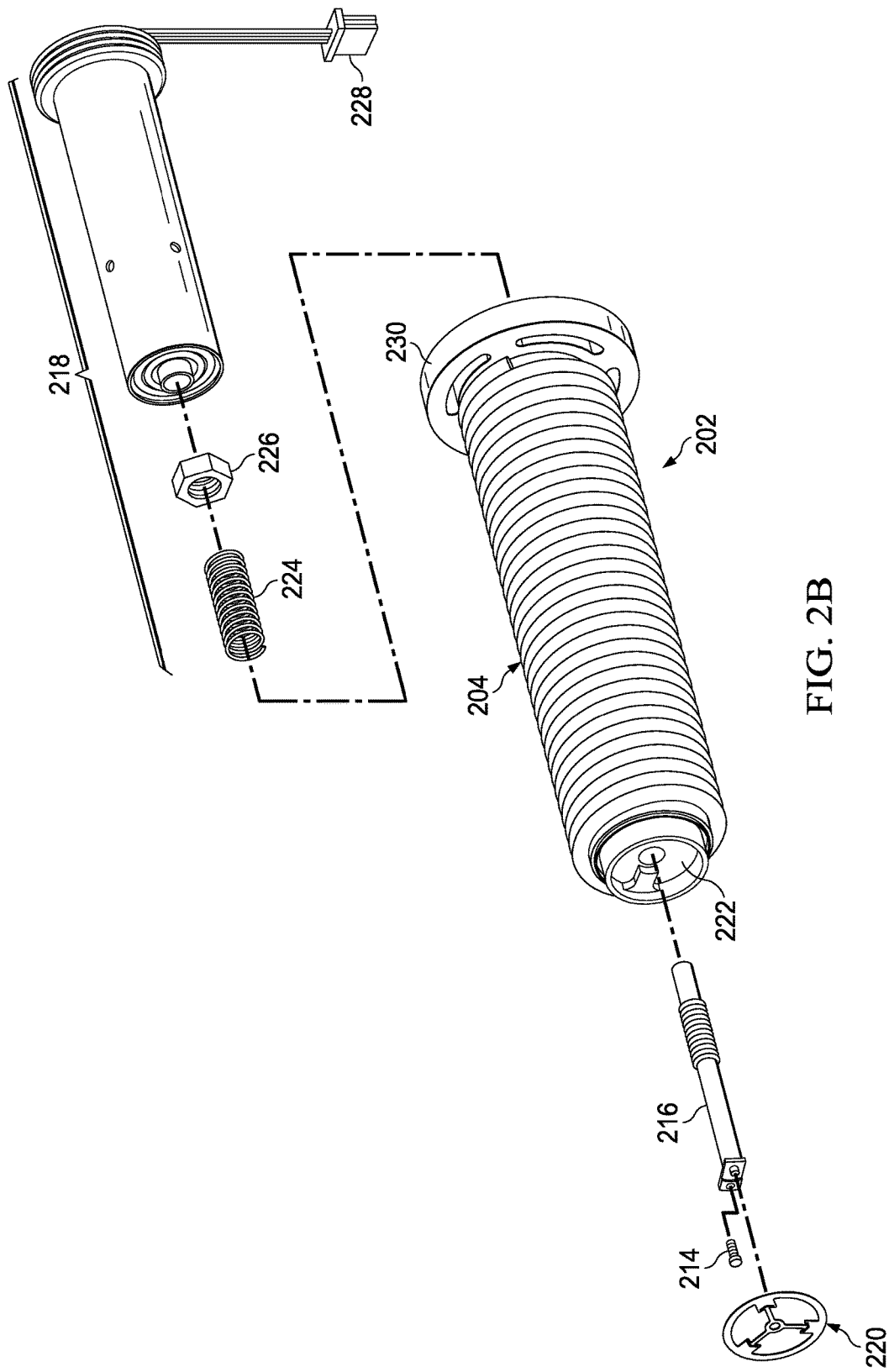
Figure 2C:
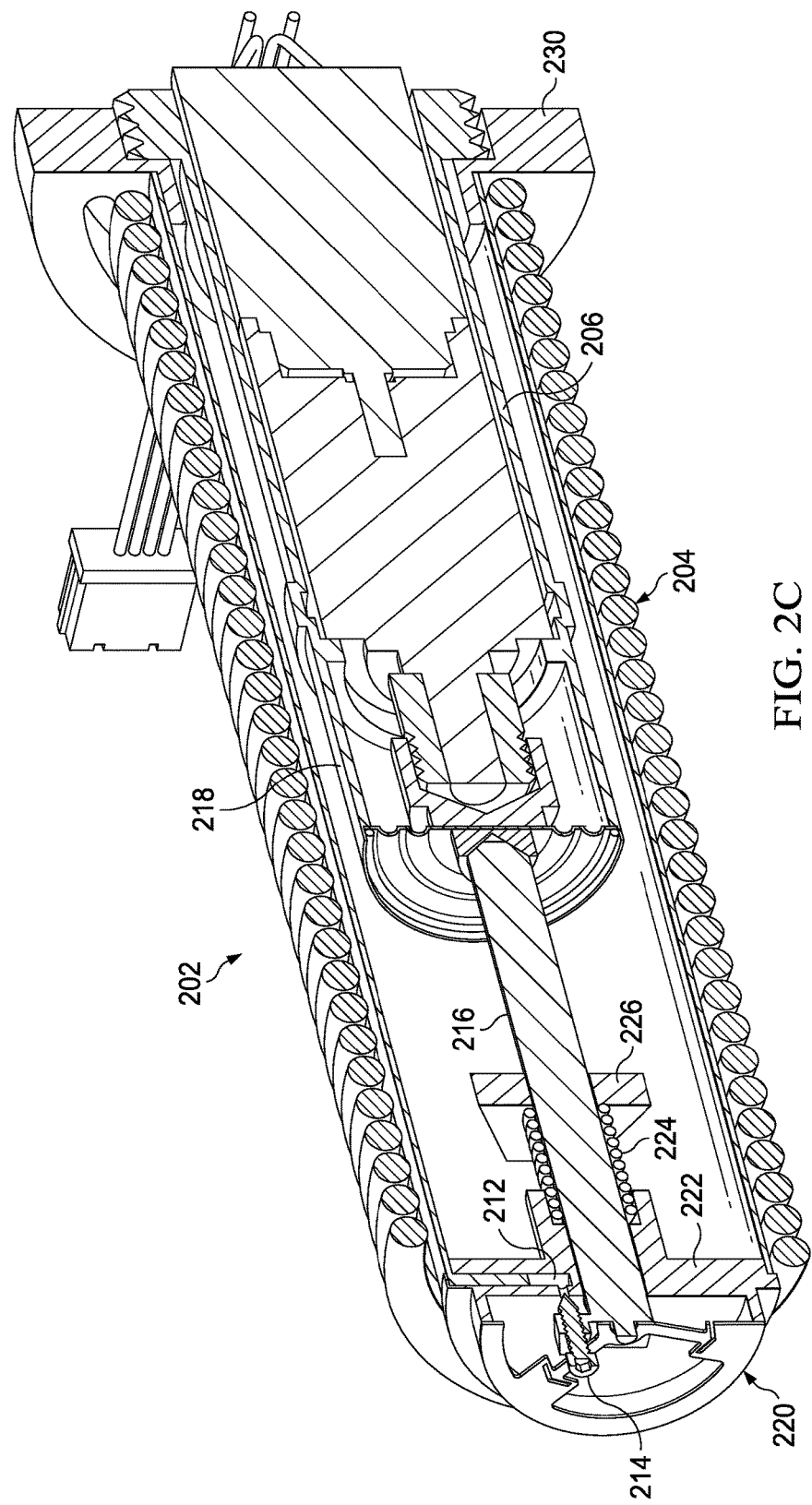
Figure 2D:
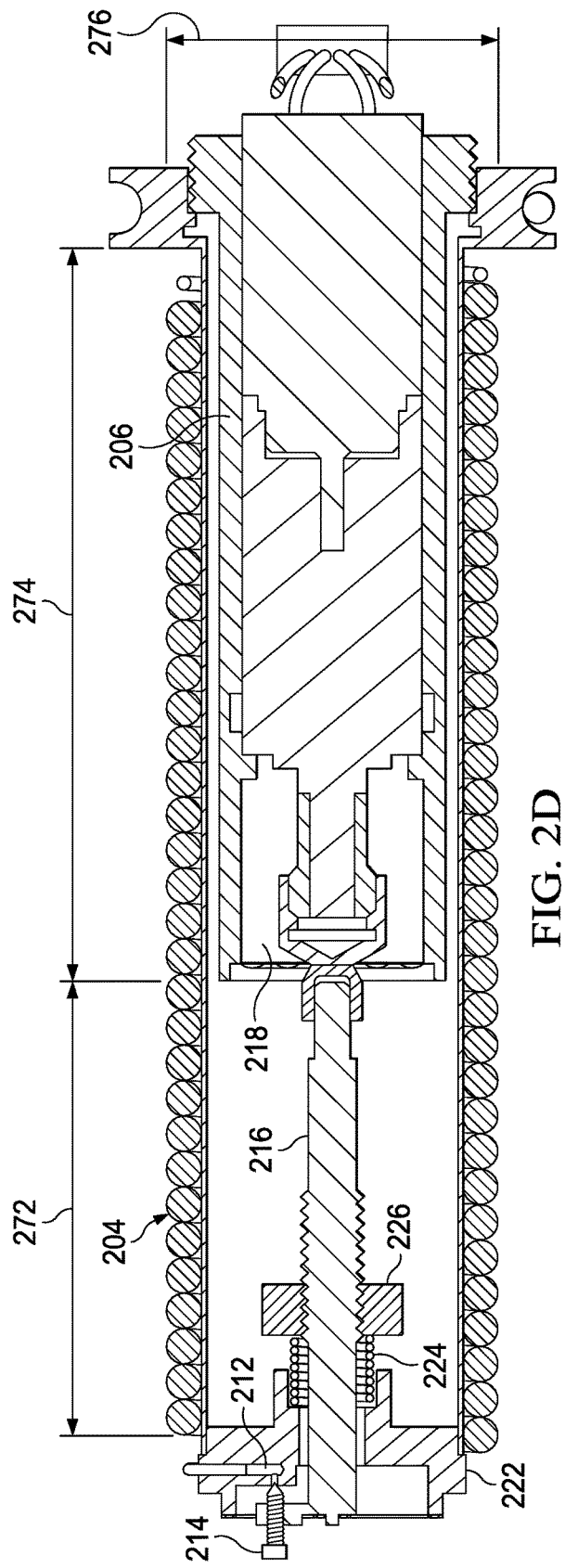
Figure 2E:
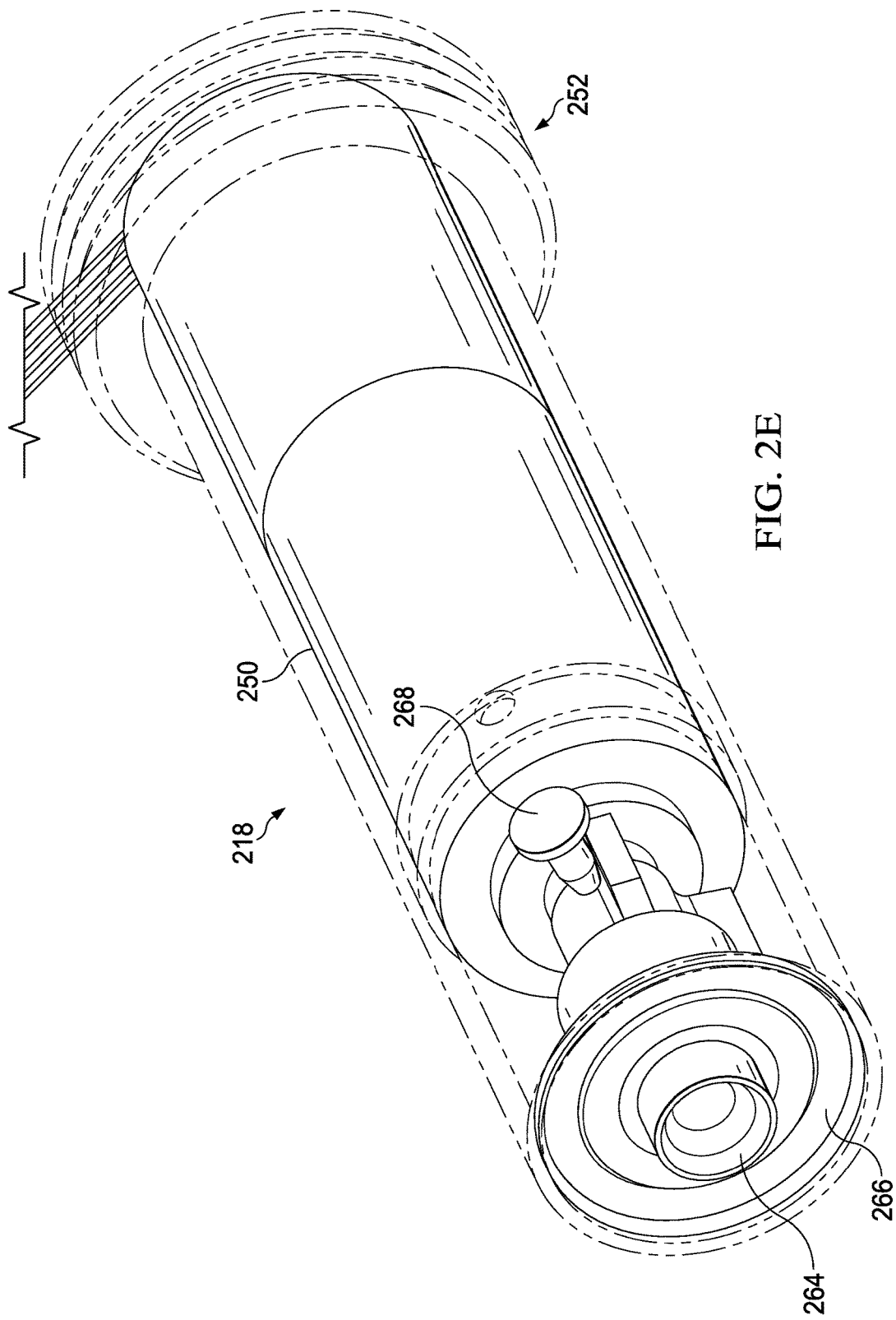
Figure 2F:
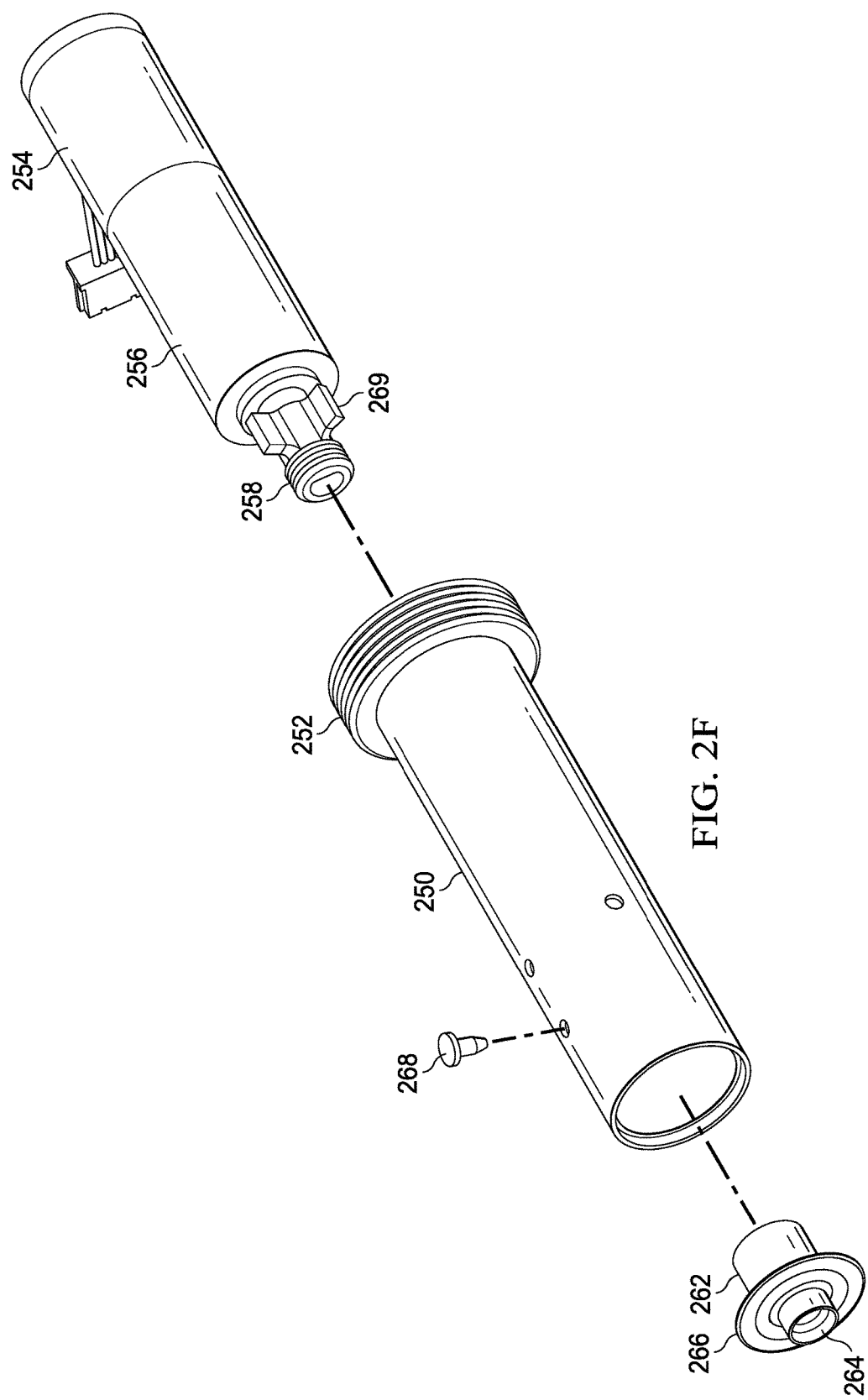
Figure 2G:
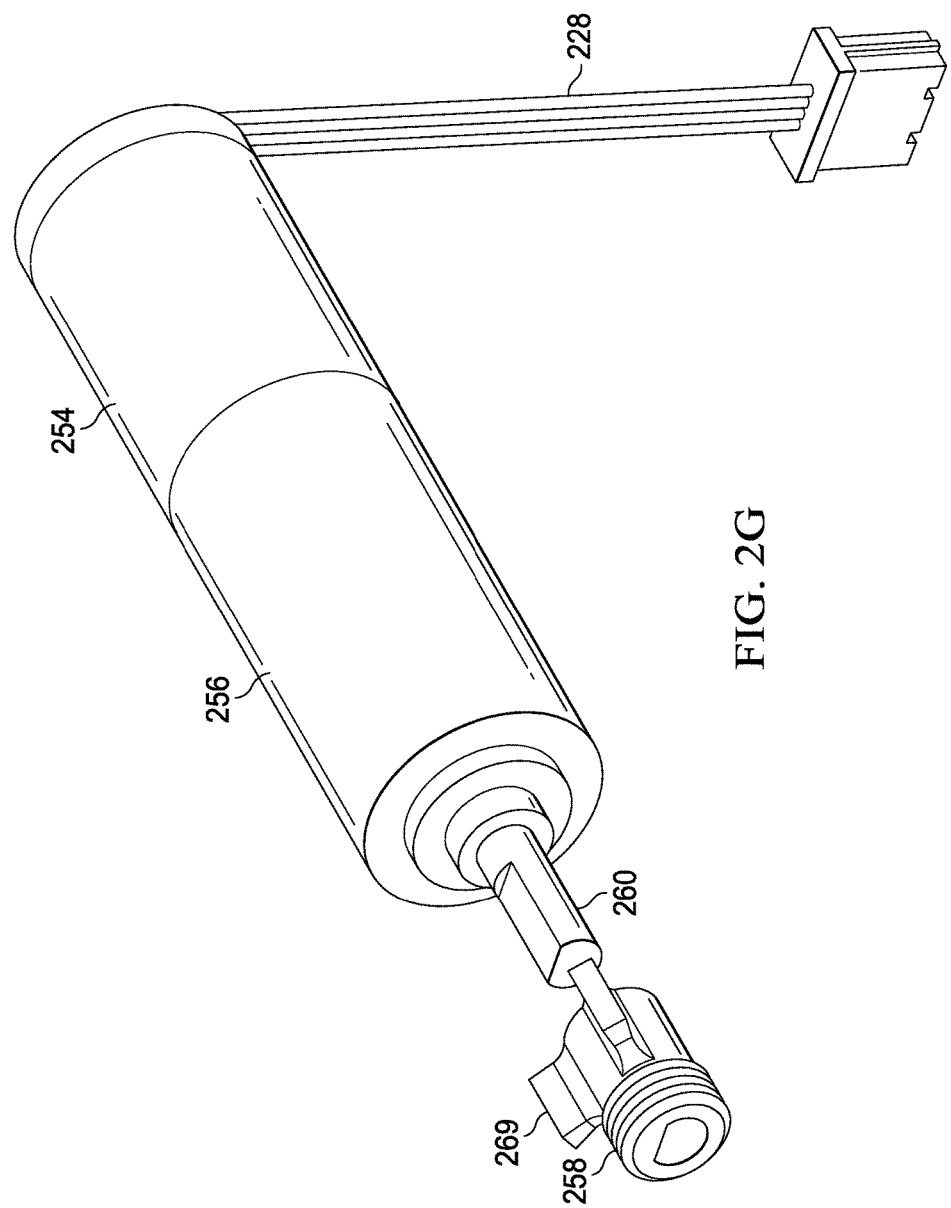
Figure 2H:
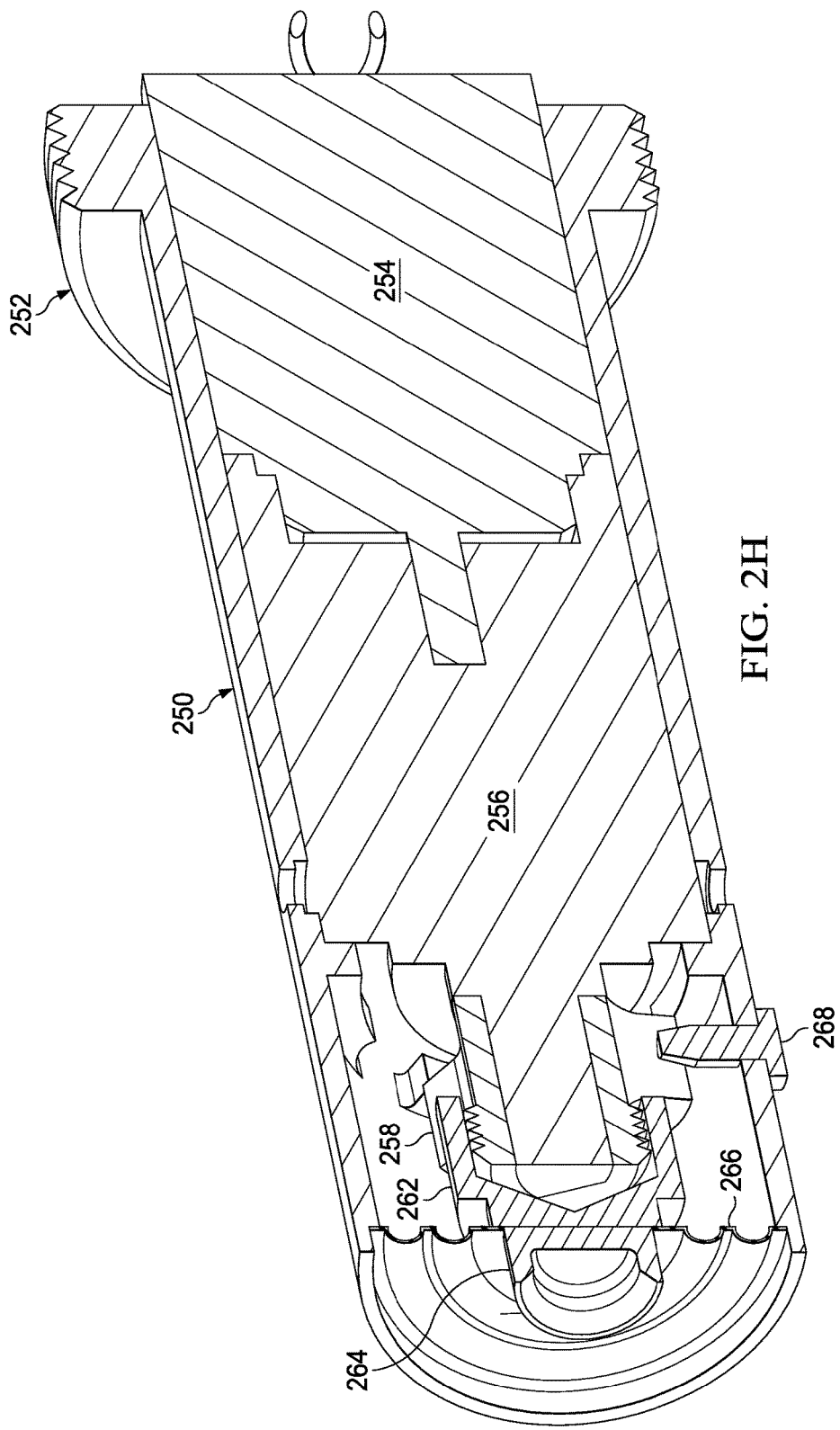
Figure 2I:
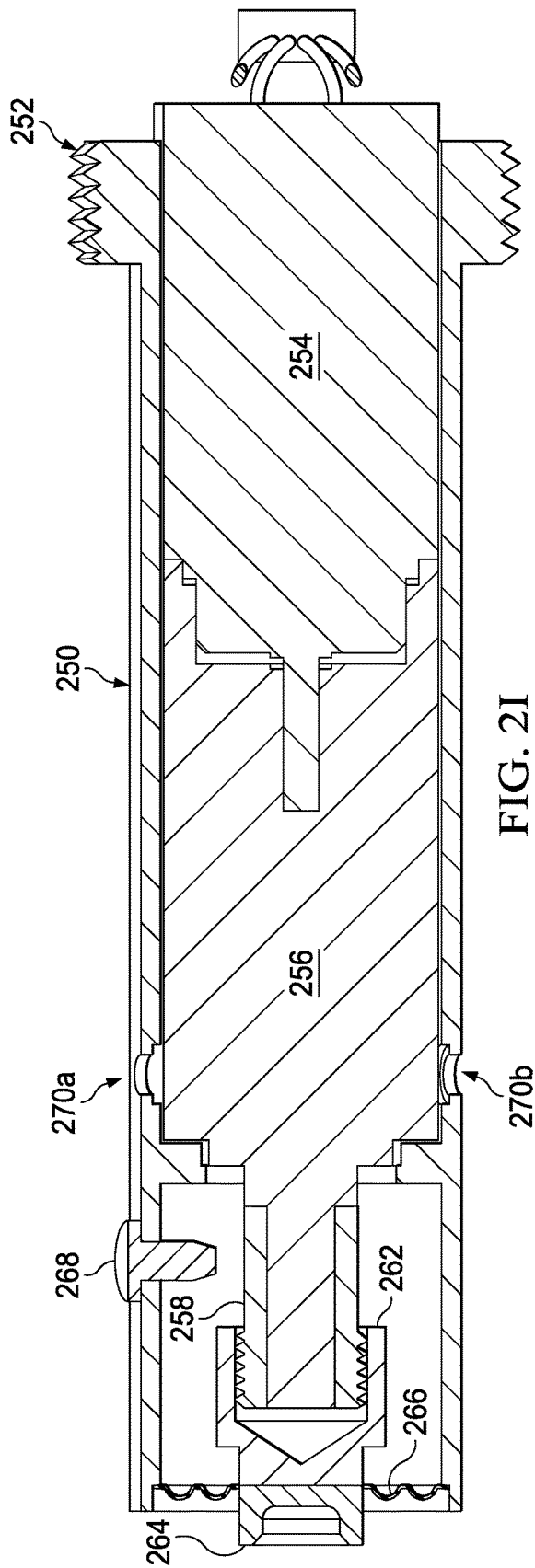

FIG. 1 illustrates an example system 100 using a cryocooler with an electronic cryostat flow controller in accordance with this disclosure. As shown in FIG. 1, the system 100 includes a focal plane array 102, which is mounted on a support structure 114 and protected by a cover 106. As noted above, the focal plane array 102 is an image sensing device where pixels are positioned at the focal plane of a lens, which is this case could reside within the cover 106. The focal plane array 102 includes any suitable image sensing device, such as an infrared sensor. The support structure 114 provides a surface where the focal plane array 102 is carried. The support structure 114 is also coupled to other housing components 104-110 of the system 100, which provide support and protection for other components of the system 100. The support structure 114 includes any suitable structure on which a focal plane array 102 can be placed. The cover 106 is placed over and provides protection to the focal plane array 102. The cover 106 can be designed to allow at least some radiation, such as infrared radiation, to pass through the cover 106. These components can be used in any suitable larger system, such as in air-to-air missile systems, anti-tank missile systems, or other missile systems.

As noted above, the temperature of the focal plane array 102 can be controlled to help ensure proper operation of the array 102. For example, in order to obtain accurate target acquisition in a missile system, the focal plane array 102 may need to be cooled to a temperature of 90° K (plus or minus several tenths of a degree). The system 100 therefore includes a cryocooler 112, and the support structure 114 includes a cooling plate. The cryocooler 112 controls the flow of at least one coolant gas, which can be converted into a liquid via operation of the cryocooler 112. The liquid can be sprayed onto the cooling plate to adjust the temperature of the focal plane array 102.

Conventional cryocoolers are often unable to precisely control the temperature of a focal plane array. For example, various systems place a thermostat inside the actual cryocooler. However, the cryocooler can have a thermal response time that is significantly different than the thermal response time of a focal plane array. As a result, the thermostat is often tuned to lag the thermal response of the focal plane array. Because of this, conventional systems could stop or slow the flow of coolant gas too early or not at all, providing unstable temperature control. Also, conventional systems may be inefficient in their use of coolant gas, requiring a larger supply canister for providing the coolant gas. Conventional systems are further prone to clogging.

The cryocooler 112 used in the system 100 can overcome these types of problems. For example, the cryocooler 112 can incorporate an electronic cryostat flow controller that precisely controls the position of a needle in an orifice of the cryocooler 112. The needle controls the flow of high-pressure coolant gas through a heat exchanger. The cryocooler 112 can therefore achieve extremely accurate flow control of the high-pressure coolant gas. Moreover, the position of the needle can be controlled using temperature readings from at least one temperature sensor 116 actually on or near an object being cooled. This enables extremely accurate temperature control of the object being cooled.

As described below, different types of electronic cryostat flow controllers can be used in the cryocooler 112. These include piezoelectric flow controllers, flow controllers that use stepper motors, and flow controllers that use direct current (DC) motors. Regardless of the implementation, the flow controllers can provide extremely precise control of the position of the needle in the cryocooler 112, such as a precision of about 0.0002 inches or less.

Additional details regarding example implementations of the cryocooler 112 are provided below. The cryocooler 112 includes any suitable structure for adjusting the temperature of an object using a precise-controlled coolant gas flow. The cooling plate includes any suitable structure that is cooled by a cryocooler to control the temperature of an object, such as a metallic or other conductive plate. Each temperature sensor 116 includes any suitable structure for measuring temperature, such as a thermocouple.

In this example, a controller 118 is coupled to the cryocooler 112. The controller 118 can control various operations of the cryocooler 112. For example, the controller 118 could receive temperature measurements from the temperature sensor(s) 116 and control the cooling provided by the cryocooler 112. As a specific example, the controller 118 can cause the cryocooler 112 to adjust the position of the needle to control the flow of high-pressure coolant gas through the heat exchanger. The controller 118 includes any suitable structure for controlling operation of a cryocooler. The controller 118 could, for example, include a microprocessor, microcontroller, digital signal processor, field programmable gate array, or application specific integrated circuit.

Through use of a cryocooler 112 implemented in this manner, various benefits could be obtained depending on the implementation. For example, greater control of an object's temperature can be obtained, helping to ensure proper operation. Also, precise control can be maintained even during stressing events in a larger system, such as large pressure changes during a rocket separation. In addition, the cryocooler 112 can be highly tolerant of gas contaminants and can result in smaller gas canisters being needed due to its more efficient use of the coolant gas.

Although FIG. 1 illustrates one example of a system 100 using an electronic cryostat flow controller, various changes may be made to FIG. 1. For example, while described as being used to control the temperature of a focal plane array 102, the cryocooler 112 could be used to control the temperature of any other suitable object(s). Also, as described below, the cryocooler 112 shown in FIG. 1 is one specific implementation of a cryocooler. Other implementations of the cryocooler 112, including the ones described below, could be used in the system 100.

FIGS. 2A through 2I illustrate a first example cryocooler 200 with an electronic cryostat flow controller in accordance with this disclosure. The cryocooler 200 could, for example, be used as the cryocooler 112 in the system 100 of FIG. 1. However, the cryocooler 200 could also be used in any other suitable device or system.

As shown in FIGS. 2A through 2D, the cryocooler 200 includes a heat exchanger 202. The heat exchanger 202 includes a tube 204 wrapped around a support mandrel 206. In one aspect of operation, a high-pressure coolant gas flows through the tube 204 from a "warm" end 208 of the heat exchanger 202 to a "cool" end 210 of the heat exchanger 202. The high-pressure coolant gas can exit the tube 204 through an orifice 212, which can be selectively blocked and unblocked by a needle 214. When the high-pressure coolant gas escapes from the tube 204, the coolant gas expands, cooling the coolant gas even further and creating a liquid that is sprayed onto a cooling plate or other structure. Precise control of the needle's position can be used to precisely control the amount of coolant gas passing through the heat exchanger 202, which controls the amount of cooling provided by the cryocooler 200.

The heat exchanger 202 includes any suitable structure for lowering the temperature of a coolant gas. The tube 204 includes any suitable structure through which coolant gas flows in a heat exchanger, such as metal tubing. The tube 204 can receive the coolant gas from any suitable external source, such as a canister. Note that an inlet particle filter, such as one with a five micron nominal filtration rating, can be used to filter the coolant gas. The support mandrel 206 includes any suitable structure around which a tube is wrapped in a heat exchanger. The orifice 212 represents any suitable opening through which coolant gas can pass. The needle 214 includes any suitable structure for controlling the flow of coolant gas through an orifice, such as a 0.55 UNM (203 tpi) needle.

In this example, the needle 214 is moved using a motion rod 216 that is controlled by an actuator assembly 218. The needle 214 is physically inserted into or otherwise physically connected to the motion rod 216. Movement of the motion rod 216 in one direction (away from the actuator assembly 218) moves the needle 214 out of the orifice 212 and starts or increases the release of coolant gas through the orifice 212. Movement of the motion rod 216 in another direction (towards the actuator assembly 218) moves the needle 214 into the orifice 212 and slows or stops the release of coolant gas through the orifice 212. The actuator assembly 218 controls the movement of the motion rod 216 to thereby control the opening and closing of the orifice 212 by the needle 214.

The motion rod 216 includes any suitable structure for moving a needle under the control of an actuator assembly. The actuator assembly 218 includes any suitable structure for controlling movement of a needle. Various example implementations of an actuator assembly 218 are shown in these figures and in the figures discussed below. Note that in this example the actuator assembly 218 is mounted to the "warm" end 210 of the heat exchanger 202, which can help to reduce or minimize thermal loads placed on the actuator assembly 218.

A flexure bearing 220 is used in conjunction with the motion rod 216. As shown here, the tip of the motion rod 216 is inserted through an opening in the center of the flexure bearing 220. This helps to keep the motion rod 216 from moving side-to-side and to keep the needle 214 aligned with the orifice 212. The flexure bearing 220 is also attached to an end piece 222 of the cryocooler 200. The flexure bearing 220 includes any suitable structure for maintaining alignment of a needle. The flexure bearing 220 can be formed from any suitable material(s), such as a metal. The end piece 222 includes any suitable structure capping a cryocooler and includes the orifice 212.

In this example, a spring 224 and a nut 226 are used to bias the needle 214 in a position that blocks the orifice 212. More specifically, the nut 226 is secured to the motion rod 216, such as on a threaded portion of the motion rod 216. The spring 224 is positioned between the nut 226 and the end piece 222. The spring 224 pushes against the nut 226, causing the motion rod 216 to keep the needle 214 in a position that blocks the orifice 212 until the actuator assembly 218 physically pushes the motion rod 216 to overcome the biasing and open the orifice 212. The spring 224 includes any suitable structure for biasing a motion rod, such as a metal spring. The nut 226 includes any suitable structure for attachment to a motion rod, such as an NAS671C2 nut with #2-56 threads. Note that this represents one way of biasing the needle 214 and other techniques could be used. For instance, the motion rod 216 could include a larger middle section that contacts the spring 224, and the nut 226 could be omitted.

An electrical connection 228 provides various signals to the actuator assembly 218. For example, the electrical connection 228 could provide power (such as a 24V signal) and control signals to the actuator assembly 218. The electrical connection 228 includes any suitable structure providing electrical connections to an actuator assembly. In this example, the electrical connection 228 includes four wires with a specific type of connector assembly at their far end, namely a four-wire harness with a Molex 51021-400 connector. However, any number of wires and any type of connector assembly could be used. The actuator assembly 218 is also secured in this example to an exhaust flange 230, although the actuator assembly 218 could be secured to any other suitable structure. The exhaust flange 230 could represent an internally-threaded warm flange with exhaust holes.

Details of an example actuator assembly 218 are shown in FIGS. 2E through 2I. The cryocooler 200 here supports a modular design where the actuator assembly 218 can separate easily from valve components (needle 214 and motion rod 216) and can fit within the heat exchanger 202. In this example, the actuator assembly 218 includes an actuator housing 250, which encases and supports other components of the actuator assembly 218. The housing 250 includes a threaded portion 252, which allows the housing 250 to be secured to the exhaust flange 230 or other structure. The housing 250 includes any suitable structure for housing other components of an actuator assembly. The threaded portion 252 includes any suitable threaded structure for coupling an actuator assembly to another component, such as ⅜-56 threads. The use of this or other type of threading can allow for fine adjustments to the position of the actuator assembly 218 when installed in a larger system. Note that the threaded portion 252 represents one example way of securing the actuator assembly 218 to another structure and that other techniques could be used.

The actuator assembly 218 also includes a motor 254, a gear head 256, and a lead screw 258. The lead screw 258 is mounted on a shaft 260 of the gear head 256. The motor 254 is configured to turn the gear head 256, which causes the lead screw 258 to rotate. The lead screw 258 is physically connected to a lead screw nut 262, which physically contacts a motion rod cup 264 or a diaphragm 266 coupled to the motion rod cup 264. The motion rod cup 264 receives and retains the motion rod 216.

When the motor 254 and gear head 256 rotate the lead screw 258 in one direction, this pushes the lead screw nut 262 towards the diaphragm 266. The lead screw nut 262 therefore applies force to the motion rod cup 264, causing the motion rod cup 264 to move the motion rod 216 in one direction. This moves the needle 214 out of the orifice 212, allowing coolant gas to flow out of the heat exchanger 202.

When the lead screw 258 rotates in another direction, this causes the lead screw nut 262 to move away from the diaphragm 266. The lead screw nut 262 therefore applies less or no force to the motion rod cup 264, which applies less or no force to the motion rod 216. With the bias provided by the spring 224, this moves the needle 214 into the orifice 212, blocking coolant gas from flowing out of the heat exchanger 202. Depending on the implementation, the motion rod cup 264 may stop contacting the motion rod 216 all together when in this state, creating slack between the motion rod cup 264 and the motion rod 216.

The diaphragm 266 helps to maintain the motion rod cup 264 in a suitable position within the actuator assembly 218. The diaphragm 266 also helps to prevent rotation of the lead screw nut 262, which allows the lead screw nut 262 to convert the gear head's output torque into a linear pushing force. The diaphragm 266 can further act as a flexure bearing for frictionless or near frictionless axial motion. The actuator housing 250 can form an anti-rotational seal with the diaphragm 266.

The motor 254 and gear head 256 include any suitable structure(s) for providing rotational movement. In some embodiments, the motor 254 represents a DC stepper motor. In particular embodiments, the motor 254 represents an ADM0620-2R-V3-05 stepper motor with a 16:1 planetary gear head 256 from MICROMO ELECTRONICS INC. The lead screw 258 and lead screw nut 262 include any suitable structure(s) for translating rotational motion into linear motion. The lead screw 258 and lead screw nut 262 can be formed from any suitable material(s), such as materials selected to provide low friction. In particular embodiments, the lead screw 258 represents a #4-100 bronze lead screw, and the lead screw nut 262 represents a stainless steel nut. The use of #4-100 threads could allow for more than 180° of rotation and a total of about 0.005 inches of linear travel. A single motor step could produce about 0.000031 inches of linear travel, and typical backlash of less than or equal to 3° could produce lead screw movement of about 0.000083 inches. The actuator assembly 218 could produce about 0.88 foot pounds at its minimum motor torque and highest friction factor. The motion rod cup 264 includes any suitable structure for receiving and retaining a motion rod. The diaphragm 266 includes any suitable structure for holding a motion rod cup in place and can be formed from any suitable material(s), such as stamped stainless steel that is about 0.0005 inches to about 0.002 inches thick.

The actuator assembly 218 further includes one or more hard stop pins 268. A hard stop-pin 268 can physically contact a fin 269 of the lead screw 258 to stop rotation of the lead screw 258. This allows the lead screw 258 to be driven to a known position. In particular embodiments, the actuator assembly 218 includes one hard stop pin 268, and the lead screw 258 includes two fins 269 that are 240° apart. The hard stop pin 268 and the fins 269 can define a reference position and another position for the lead screw 258, such as positions associated with maximum and minimum positions of the needle 214. Each hard stop pin 268 includes any suitable structure for stopping rotation of a lead screw.

In addition, the housing 250 of the actuator assembly 218 includes one or more injection holes. In this example, two injection holes 270a-270b are visible in the housing 250, although any other number of injection holes could be used. The injection holes 270a-270b provide access points for the injection of epoxy or other material to anchor the gear head 256 inside the actuator housing 250. Each injection hole 270a-270b includes any suitable opening in a housing.

In particular embodiments, the cryocooler 200 can have the following features. Various components of the cryocooler 200 (such as the mandrel 206, actuator housing 250, and motion rod 216) can be fabricated using INVAR 36 to minimize shifts in the slack between the motion rod 216 and the motion rod cup 264 during changes in temperature. Also, the cryocooler 200 can function effectively over a wide range of vibration environments and a wide range of ambient temperatures. Moreover, the cryocooler 200 could have any suitable size, shape, and dimensions. In particular embodiments, the dimension 272 in FIG. 2D could be about 0.6 inches, the dimension 274 in FIG. 2D could be about 1.1 inches, and the dimension 276 in FIG. 2D could be about 0.440 inches. At this size, the cryocooler 200 could fit into a RIM-161 Standard Missile 3 (SM-3) Block I/IA/IB ship-based missile system or an ASRAAM or AIM-9X air-to-air missile system (with cryo-adapters, P/N 2237605-1).

Various processing operations could be used to fabricate some embodiments of the cryocooler 200. For example, an adhesive lap joint can be used to secure the lead screw 258 to the gear head 256, and the lead screw nut 262 can be spot-welded to the diaphragm 266. An adhesive butt joint can be used to secure the motion rod cup 264 to the diaphragm 266, and an adhesive lap joint can be used to secure the gear head 256 to the housing 250 (the adhesive can be applied in channels through the injection holes). An all-around adhesive joint can be used to secure the diaphragm 266 to the housing 250, and the hard stop pin(s) 268 can be staked within suitable opening(s) of the housing 250. An adhesive stake can be used to secure the needle 214 to the motion rod 216, and the spring 224 can be set by assembling the structure so that the spring 224 has a solid height and then moving the nut 226 back to partially release the spring. In particular embodiments, the spring 224 is preloaded to about 0.596±0.034 foot pounds with an assembled compression size of about 0.297", and the nut 226 is rotated about nine turns to partially release the spring. Once fabricated, the cryocooler 200 can be installed using the threaded portion 252 of the housing 250, and its assembled axial position can be adjusted using the threads on the threaded portion 252 (such as an about 0.0002" linear adjustment for a 4° rotation).

FIG. 3 illustrates a second example cryocooler 300 with an electronic cryostat flow controller in accordance with this disclosure. The cryocooler 300 is similar in structure to the cryocooler 200. For example, the cryocooler 300 includes a heat exchanger 302 having a tube 304 wrapped around a mandrel 306. Coolant gas in the tube 304 is released through an orifice 312, which is controlled by a needle 314. A motion rod 316 is attached to the needle 314 and controls the opening and closing of the orifice 312. These components could be the same as or similar to corresponding components in the cryocooler 200.

The cryocooler 300 also includes an actuator assembly 318 that controls the movement of the motion rod 316. The actuator assembly 318 here includes a housing 350, a motor 354, a gear head 356, and a lead screw 358. The lead screw 358 is physically connected to a lead screw nut 362, which physically contacts a motion rod bushing 364 that is attached to or otherwise contacts the motion rod 316. Rotation of the lead screw 358 is translated into linear motion by the lead screw nut 362, and the motion rod bushing 364 moves the motion rod 316 in response to that linear motion.

The cryocooler 300 further includes a spring 324 and a diaphragm 366. These components are in different positions in the cryocooler 300 compared to the cryocooler 200, although their functions are similar. The spring 324 biases the motion rod 316 in a position where the needle 314 closes the orifice 312. The diaphragm 366 helps to maintain the motion rod 316 in a suitable position within the cryocooler 300 and allows restrained movement of the motion rod 316 back and forth. A space 380 here provides room for a pre-cooler if desired.

The cryocooler 300 here uses a similar type of actuator assembly as the cryocooler 200. That is, both cryocoolers 200 and 300 use a DC stepper motor or other suitable DC motor to provide precise control of the movement of the needle 214, 314.

Figure 4:
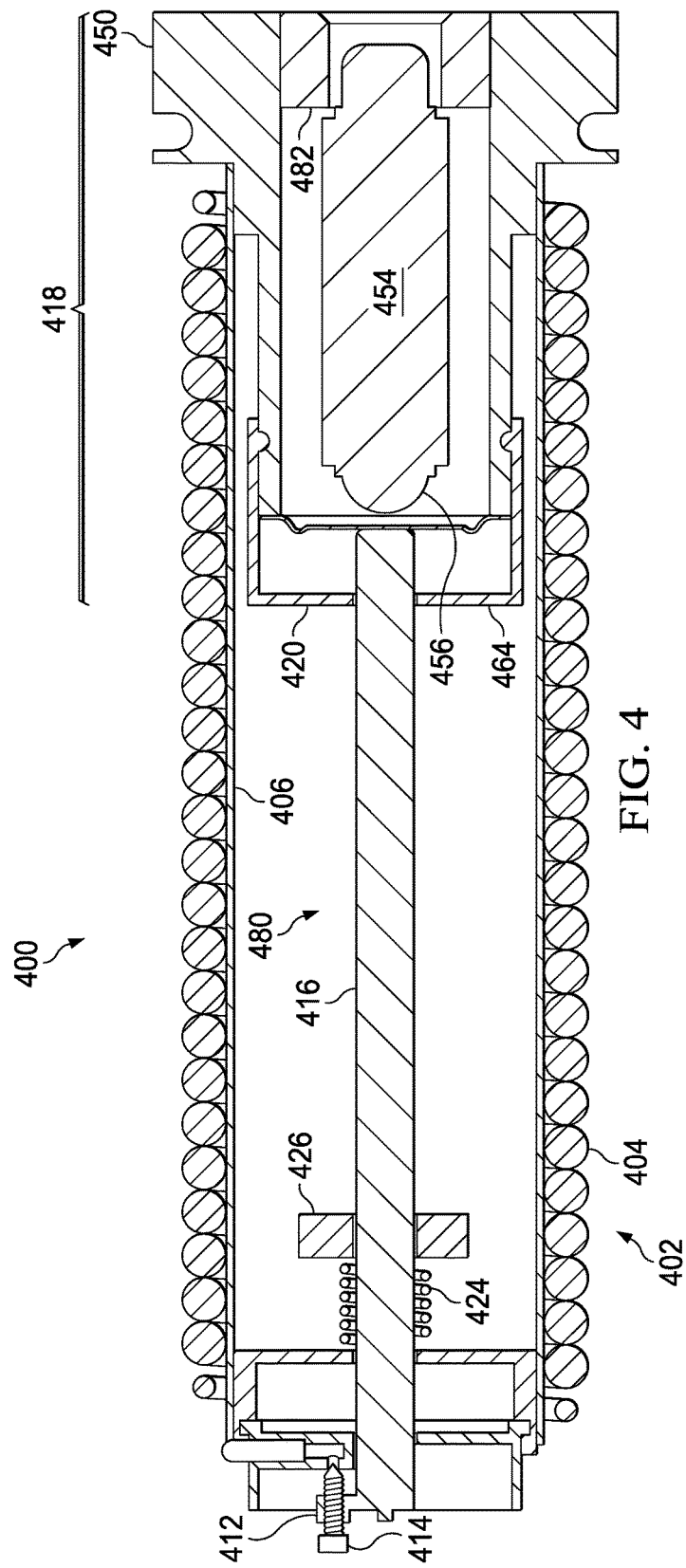
FIG. 4 illustrates a third example cryocooler with an electronic cryostat flow controller in accordance with this disclosure.

FIG. 4 illustrates a third example cryocooler 400 with an electronic cryostat flow controller in accordance with this disclosure. The cryocooler 400 is similar in structure to the cryocoolers 200 and 300, although the cryocooler 400 uses a different type of actuator assembly. For example, the cryocooler 400 includes a heat exchanger 402 having a tube 404 wrapped around a mandrel 406. Coolant gas in the tube 404 is released through an orifice 412, which is controlled by a needle 414. A motion rod 416 is attached to the needle 414 and controls the opening and closing of the orifice 412. A spring 424 and a nut 426 are used to bias the needle 414 in a position that blocks the orifice 412.

An actuator assembly 418 controls movement of the motion rod 416, which is connected to a motion rod bushing 464. Here, the actuator assembly 418 represents a piezoelectric actuator. A piezoelectric material is a material that exhibits the piezoelectric effect, meaning it generates an electrical charge based on an applied mechanical force and it generates mechanical force based on an applied electrical field. The piezoelectric actuator 418 can therefore generate movement of the motion rod 416 in response to an electrical field applied to a piezoelectric material in the actuator 418.

In this example, the actuator assembly 418 includes a housing 450, a piezoelectric actuator 454, a potting material 456, and a flexure bearing 420. The piezoelectric actuator 454 includes at least one piezoelectric material that can apply force against the flexure bearing 420 in response to an applied electrical field. The piezoelectric actuator 454 includes any suitable structure using at least one piezoelectric material for providing actuation, such as an SQL-3.4 actuator in a "push open" configuration from NEW SCALE TECHNOLOGIES INC. The potting material 456 includes any suitable structure for holding a piezoelectric actuator in place and can be formed from any suitable material(s). The flexure bearing 420 includes any suitable structure for applying force from a piezoelectric actuator to a motion rod.

A space 480 here provides room for a pre-cooler if desired. Also, limit switches 482 are used here to limit the amount of travel that the actuator 454 can take during operation.

Figure 5:
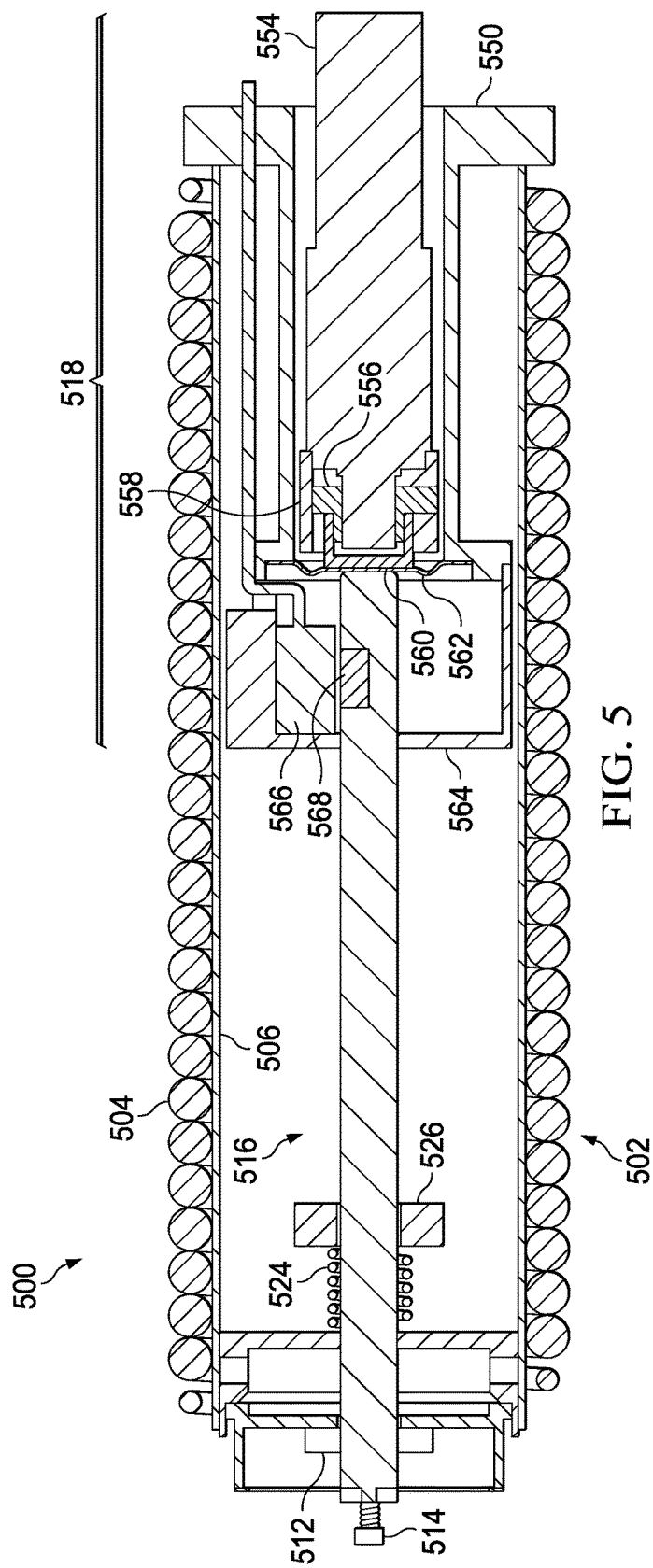
FIG. 5 illustrates a fourth example cryocooler with an electronic cryostat flow controller in accordance with this disclosure.

FIG. 5 illustrates a fourth example cryocooler 500 with an electronic cryostat flow controller in accordance with this disclosure. The cryocooler 500 is similar in structure to the cryocoolers described above, although the cryocooler 500 again uses a different type of actuator assembly. For example, the cryocooler 500 includes a heat exchanger 502 having a tube 504 wrapped around a mandrel 506. Coolant gas in the tube 504 is released through an orifice 512, which is controlled by a needle 514. A motion rod 516 is attached to the needle 514 and controls the opening and closing of the orifice 512. A spring 524 and a nut 526 are used to bias the needle 514 in a position that blocks the orifice 512.

An actuator assembly 518 controls movement of the motion rod 516. In this example, the actuator assembly 518 includes a housing 550 and a DC linear actuator 554. Because a linear actuator is used, various components described above for converting rotational motion into linear motion are not required here. The linear actuator 554 can apply force against an actuator nut 556 that is coupled to the linear actuator 554. The actuator nut 556 is inserted within an actuator nut keyway 558, and a nut cap 560 is placed over the actuator nut 556. A diaphragm 562 separates the nut cap 560 from the motion rod 516. Movement of the linear actuator 554 in one direction moves the actuator nut 556 and the nut cap 560 towards the motion rod 516, causing the motion rod 516 to move the needle 514 and open the orifice 512. Movement of the linear actuator 554 in another direction moves the actuator nut 556 and the nut cap 560 away from the motion rod 516, allowing the spring 524 to push the motion rod 516 and move the needle 514 to close the orifice 512.

The linear actuator 554 includes any suitable actuator providing linear motion, such as a DC motor linear actuator with a 125:1 gear head from MICROMO ELECTRONICS INC. The actuator nut 556 includes any suitable structure placed around at least a portion of a linear actuator. The actuator nut keyway 558 includes any suitable structure in which an actuator nut is placed. The nut cap 560 includes any suitable structure for covering an actuator nut.

In this example, the actuator assembly 518 further includes a motion rod bushing 564, a magnetic sensor 566, and a magnet 568. The motion rod bushing 564 helps to hold the motion rod 516 in place. The magnetic sensor 566 detects the presence of a magnetic field generated by the magnet 568, which is embedded in or on the motion rod 516. The magnetic sensor 566 is therefore used to sense the position of the motion rod 516.

The motion rod bushing 564 includes any suitable structure for supporting the motion rod. The magnetic sensor 566 includes any suitable structure for measuring a magnetic field, such as a Hall effect sensor. As a particular example, the magnetic sensor 566 could include an SS495 series miniature ratiometric linear Hall effect sensor. The magnet 568 includes any suitable magnetic structure in or on a motion rod. As a particular example, the magnet 568 can include a 1/16" by 1/16" by 1/32" neodymium (NdFeB) grade N42 magnet with a field visualization at about 0.006 inches.

Although FIGS. 2A through 5 illustrate examples of cryocoolers with electronic cryostat flow controllers, various changes may be made to FIGS. 2A through 5. For example, each component shown in these figures could have any suitable size, shape, and dimensions and can be formed from any suitable material(s) and in any suitable manner. Also, one or more components shown in these figures could be omitted if the functions associated with those components are not needed. Further, a feature shown in one or more of these figures could be used in any other of these figures. In other words, these figures illustrate various features that can be used, and any suitable combination of these features could be used in a specific implementation of a cryocooler. In addition, any of the cryocoolers shown here could be used in the system 100 of FIG. 1 or in any other suitable device or system.

Figure 6:
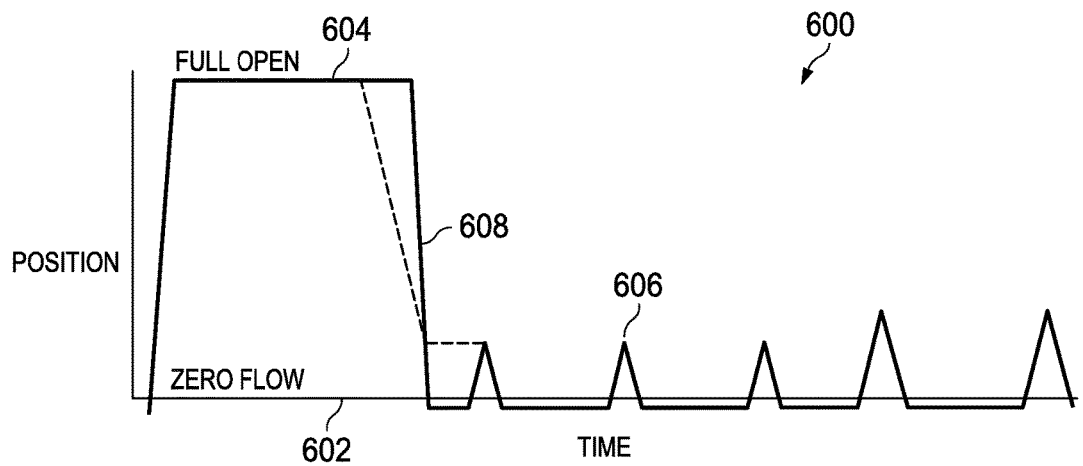
FIG. 6 illustrates example pulsed operation of a cryocooler with an electronic cryostat flow controller in accordance with this disclosure.

FIG. 6 illustrates example pulsed operation of a cryocooler with an electronic cryostat flow controller in accordance with this disclosure. More specifically, FIG. 6 illustrates an example timing diagram 600 showing an actuator drive signal for driving a cryocooler. The actuator drive signal could, for example, be generated by the controller 118 based on temperature measurements from the sensor(s) 116.

In FIG. 6, a line 602 denotes a "zero flow" position, and the actuator drive signal when driven to or below this line 602 stops the flow of coolant gas in the cryocooler. Here, the actuator drive signal can be driven below this line 602, indicating that the cryocooler operates using a "negative zero" type of control signal.

As shown in FIG. 6, when the cryocooler is first activated, a large initial pulse 604 can appear in the actuator drive signal. This pulse 604 can drive the cryocooler to or near its fully-open position, meaning the needle of the cryocooler has been removed from the orifice of the cryocooler by the maximum amount. This can result in a maximum or near-maximum amount of coolant flow and can provide rapid cooling. This can be done, for example, when the cryocooler first begins operation and must provide a rapid amount of cooling in a short period of time.

Once the temperature is at or near its desired setpoint, multiple smaller pulses 606 can be generated to help maintain the temperature at or near the setpoint. In some embodiments, each pulse 606 can have an adjustable amplitude and/or width depending on the amount of cooling needed from that pulse 606. In particular embodiments, the first pulse 606 could have a predefined amplitude, and the amplitudes of additional pulses 606 can be adjusted based on the measured temperature of the object being cooled. In other embodiments, the frequency of the pulses 606 can be adjusted depending on the amount of cooling needed.

Note that the actuator drive signal could have various forms within a transitional period 608 between the initial pulse 604 and the first of the pulses 606. The profile of the actuator drive signal can vary here depending on the implementation. In some embodiments, the profile of the actuator drive signal during the transitional period 608 can be selected to optimize the performance of the cryocooler.

In particular embodiments, the initial pulse 604 can cause the needle in the cryocooler to travel about 0.004 inches in about 0.2 seconds. Also, the first pulse 606 could cause the needle in the cryocooler to travel between about 0.0005 inches and about 0.0007 inches in about 0.05 seconds. A precision of about 0.0002 inches may be needed for partial opening of the orifice over the cooling run during the pulses 606.

Although FIG. 6 illustrates one example of pulsed operation of a cryocooler with an electronic cryostat flow controller, various changes may be made to FIG. 6. For example, adjustments to the amplitudes of the pulses 606 may not be used. Rather, the width or frequency of the pulses 606 could be adjusted based on the measured temperature of the object being cooled. A combination of two or more of amplitude, width, and frequency adjustments could also be used. In addition, any other suitable technique could be used to drive a cryocooler.

Figure 7:
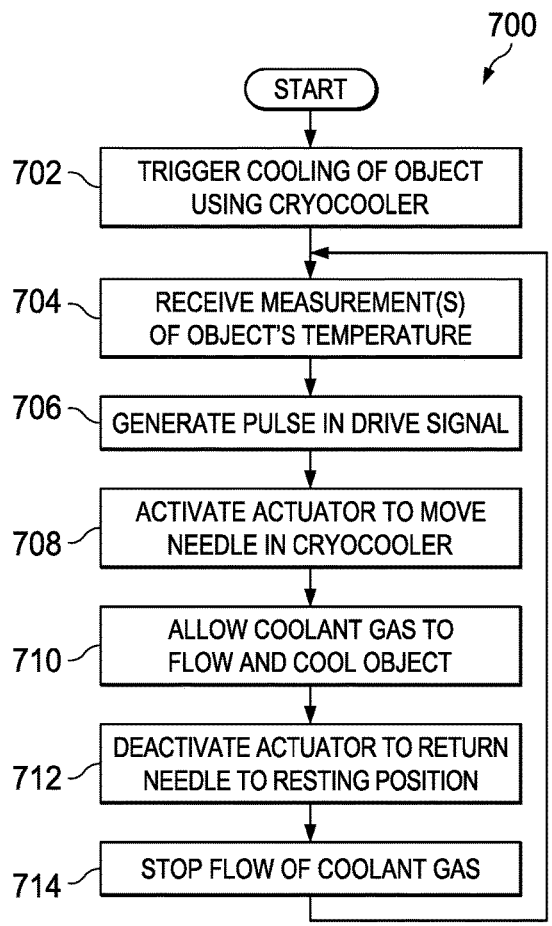
FIG. 7 illustrates an example method for cooling an object using a cryocooler with an electronic cryostat flow controller in accordance with this disclosure.

FIG. 7 illustrates an example method 700 for cooling an object using a cryocooler with an electronic cryostat flow controller in accordance with this disclosure. As shown in FIG. 7, cooling of an object using a cryocooler is triggered at step 702. This could include, for example, the controller 118 receiving an indication that cooling of a focal plane array 102 or other object is needed.

One or more measurements of the object's temperature are received at step 704. This could include, for example, the controller 118 receiving one or more temperature measurements from at least one temperature sensor 116. As described above, the temperature sensor(s) 116 can be mounted on or near the object being cooled rather than within the cryocooler itself.

A pulse in an actuator drive signal is generated at step 706. This could include, for example, the controller 118 generating a pulse in a drive signal for an actuator assembly in the cryocooler. The pulse's amplitude, width, or other characteristic could vary depending on the current temperature of the object being cooled. The pulse in the drive signal activates an actuator in the cryocooler to move a needle in the cryocooler at step 708. This allows coolant gas to flow out of the cryocooler and cool at the object at step 710. As noted above, various types of actuators could be used in a cryocooler, and the specific operations performed by the actuator can vary depending on its type. The end of the pulse deactivates the actuator in the cryocooler to return the needle in the cryocooler to its resting position at step 712. This could include, for example, a spring or other biasing mechanism returning the needle to its resting position. This stops or substantially stops the flow of coolant gas out of the cryocooler at step 714. The process then returns to step 704. Steps 704-714 could be repeated any number of times during operation of the cryocooler.

Although FIG. 7 illustrates one example of a method 700 for cooling an object using a cryocooler with an electronic cryostat flow controller, various changes may be made to FIG. 7. For example, while shown as a series of steps, various steps in FIG. 7 could overlap, occur in parallel, occur in a different order, or occur any number of times.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system comprising:
   a cryocooler configured to cool an object;
   a sensor configured to measure a temperature of the object; and
   a controller configured to generate an actuator drive signal to control the cryocooler based on at least one temperature measurement from the sensor by:
      generating multiple pulses in the actuator drive signal; and
      varying an amplitude of the pulses in the actuator drive signal based on the at least one temperature measurement;
      wherein the actuator drive signal includes an initial pulse having a first amplitude and a first of subsequent pulses having a second amplitude different from the first amplitude;
   wherein the cryocooler comprises:
      a heat exchanger;
      a needle configured to control flow of coolant gas through the heat exchanger;
      a motion rod configured to move the needle; and
      an actuator assembly configured, in response to the actuator drive signal, to move the motion rod to thereby move the needle; and
   wherein the initial pulse is configured to drive the cryocooler to or near a fully-open position in which the needle moves by a maximum amount corresponding to a maximum flow of the coolant gas through the heat exchanger, and the subsequent pulses are configured to drive the cryocooler to maintain the temperature at or near a setpoint.

2. The system of claim 1, wherein:
   the cryocooler further comprises a spring configured to bias the motion rod to move the needle into a closed position that blocks the flow of coolant gas through the heat exchanger; and
   the actuator assembly is configured to move the motion rod by pushing against the motion rod to overcome the biasing provided by the spring.

3. The system of claim 1, wherein the actuator assembly comprises:
   a motor and a gear head configured to rotate a lead screw; and
   a lead screw nut located around the lead screw and configured to translate rotational motion of the lead screw into linear motion.

4. The system of claim 3, wherein:
   the lead screw nut is connected to a diaphragm configured to prevent rotation of the lead screw nut; and
   the diaphragm is connected to a motion rod cup configured to receive the motion rod, wherein the lead screw nut is configured to push against the diaphragm to cause the motion rod cup to push against the motion rod.

5. The system of claim 3, wherein:
   the lead screw includes a fin; and
   the cryocooler further comprises a stop pin configured to contact the fin of the lead screw to stop rotation of the lead screw.

6. The system of claim 1, wherein the controller is configured to vary at least one of a width of the pulses and a frequency of the pulses based on multiple temperature measurements from the sensor.

7. The system of claim 1, wherein the actuator assembly is configured to move the motion rod with a precision of about 0.0002 inches.

8. The system of claim 1, wherein the actuator assembly resides within the heat exchanger.

9. An apparatus comprising:
   a cryocooler configured to cool an object, the cryocooler comprising:

a heat exchanger;
a needle configured to control flow of coolant gas through the heat exchanger;
a motion rod configured to move the needle; and
an actuator assembly configured, in response to an actuator drive signal having multiple pulses, to move the motion rod to thereby move the needle;
wherein an amplitude of the pulses in the actuator drive signal varies based on a temperature measurement of the object;
wherein the actuator drive signal includes an initial pulse having a first amplitude and a first of subsequent pulses having a second amplitude different from the first amplitude; and
wherein the initial pulse is configured to drive the cryocooler to or near a fully-open position in which the needle moves by a maximum amount corresponding to a maximum flow of the coolant gas through the heat exchanger, and the subsequent pulses are configured to drive the cryocooler to maintain the temperature at or near a setpoint.

10. The apparatus of claim 9, wherein:
the cryocooler further comprises a spring configured to bias the motion rod to move the needle into a closed position that blocks the flow of coolant gas through the heat exchanger; and
the actuator assembly is configured to move the motion rod by pushing against the motion rod to overcome the biasing provided by the spring.

11. The apparatus of claim 9, wherein the actuator assembly comprises:
a motor and a gear head configured to rotate a lead screw; and
a lead screw nut located around the lead screw and configured to translate rotational motion of the lead screw into linear motion;
wherein the lead screw nut is connected to a diaphragm configured to prevent rotation of the lead screw nut; and
wherein the diaphragm is connected to a motion rod cup configured to receive the motion rod, wherein the lead screw nut is configured to push against the diaphragm to cause the motion rod cup to push against the motion rod.

12. The apparatus of claim 11, wherein:
the lead screw includes a fin; and
the cryocooler further comprises a stop pin configured to contact the fin of the lead screw to stop rotation of the lead screw.

13. A method comprising:
receiving a drive signal that includes multiple pulses;
operating an actuator in a cryocooler using the drive signal;
moving a motion rod using the actuator; and
moving a needle to control a flow of coolant in a heat exchanger of the cryocooler, the needle connected to the motion rod;
wherein an amplitude of the pulses in the drive signal varies based on a temperature measurement of an object to be cooled;
wherein the drive signal includes an initial pulse having a first amplitude and a first of subsequent pulses having a second amplitude different from the first amplitude; and
wherein the initial pulse drives the cryocooler to or near a fully-open position in which the needle moves by a maximum amount corresponding to a maximum flow of coolant gas through the heat exchanger, and the subsequent pulses drive the cryocooler to maintain the temperature at or near a setpoint.

14. The method of claim 13, wherein operating the actuator comprises:
rotating a lead screw; and
translating rotational motion of the lead screw into linear motion using a lead screw nut located around the lead screw;
wherein the lead screw nut is connected to a diaphragm that prevents rotation of the lead screw nut; and
wherein the diaphragm is connected to a motion rod cup that receives the motion rod, the lead screw nut configured to push against the diaphragm to cause the motion rod cup to push against the motion rod.

15. The system of claim 1, wherein a profile of the actuator drive signal during a transitional period between the initial pulse and the first of the subsequent pulses is selected to optimize performance of the cryocooler.

* * * * *